United States Patent
Youngers

(10) Patent No.: US 6,809,843 B1
(45) Date of Patent: Oct. 26, 2004

(54) VIRTUAL WHITEBOARD

(75) Inventor: Kevin J Youngers, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/345,710

(22) Filed: Jun. 30, 1999

(51) Int. Cl.[7] .............................. H04N 1/04; G06K 9/46; G06K 9/32
(52) U.S. Cl. ...................... 358/474; 358/494; 358/497; 382/233; 382/296; 382/297
(58) Field of Search .................................. 358/474, 294, 358/497; 382/233, 296, 297

(56) References Cited

U.S. PATENT DOCUMENTS

| | | | | |
|---|---|---|---|---|
| 4,739,414 A | * | 4/1988 | Pryor et al. .................. | 358/482 |
| 4,884,146 A | * | 11/1989 | Yatsunami ................... | 358/400 |
| 5,181,129 A | * | 1/1993 | Sato et al. ................... | 358/494 |
| 5,742,409 A | * | 4/1998 | Tsai et al. ................... | 382/162 |
| 6,298,404 B1 | * | 10/2001 | Mishra ....................... | 710/100 |
| 6,318,825 B1 | * | 11/2001 | Carau, Sr. ..................... | 347/2 |
| 6,353,682 B2 | * | 3/2002 | Klassen ....................... | 382/233 |

* cited by examiner

*Primary Examiner*—Edward Coles
*Assistant Examiner*—Houshang Safaipour

(57) ABSTRACT

A virtual whiteboard is disclosed that employs a scanner as an input device of a communications system linking multiple remote participants across an Intranet or Internet in which a user writes directly onto the scanner's platen or on a clear plastic transparency on the scanner's platen with dry erase markers in the same manner a user would write on an overhead projector or a whiteboard. The scanner would then perform the scan and mirror the image from left to right and transmit an electronic signal representative of the scanned image to remote conference participants over the Internet or Intranet or other known signal transmission means.

24 Claims, 2 Drawing Sheets

VIRTUAL WHITEBOARD

FIELD OF THE INVENTION

The present invention relates generally to the field of scanners and more particularly to method for using a scanner as an overhead projector or as an input device for a telecommunications system linking multiple remote participants.

BACKGROUND OF THE INVENTION

Today, many communication conferencing systems are clumsy or quite expensive, such as cameras. It would be desirable to be able to utilize a scanner as a virtual white board or an input device of a communication system linking remote multiple participants via known data transmissions means, such as facsimile machines, telephones or through an Intranet or Internet.

SUMMARY OF THE INVENTION

The above and other aspects of the present invention are accomplished in a system and method for using a scanner as an input device of a communications system linking multiple remote participants across an Intranet or Internet in which a user writes directly onto the scanner's platen or on a clear plastic transparency on the scanner's platen with dry erase markers in the same manner a user would write on an overhead projector or a whiteboard. The scanner would then perform the scan and mirror the image from left to right and transmit an electronic signal representative of the scanned image. This could be a means of communication linking multiple remote participants or posted on a web page to be viewed by any of the participants. This could be transmitted via facsimile machine or other known data transmissions.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
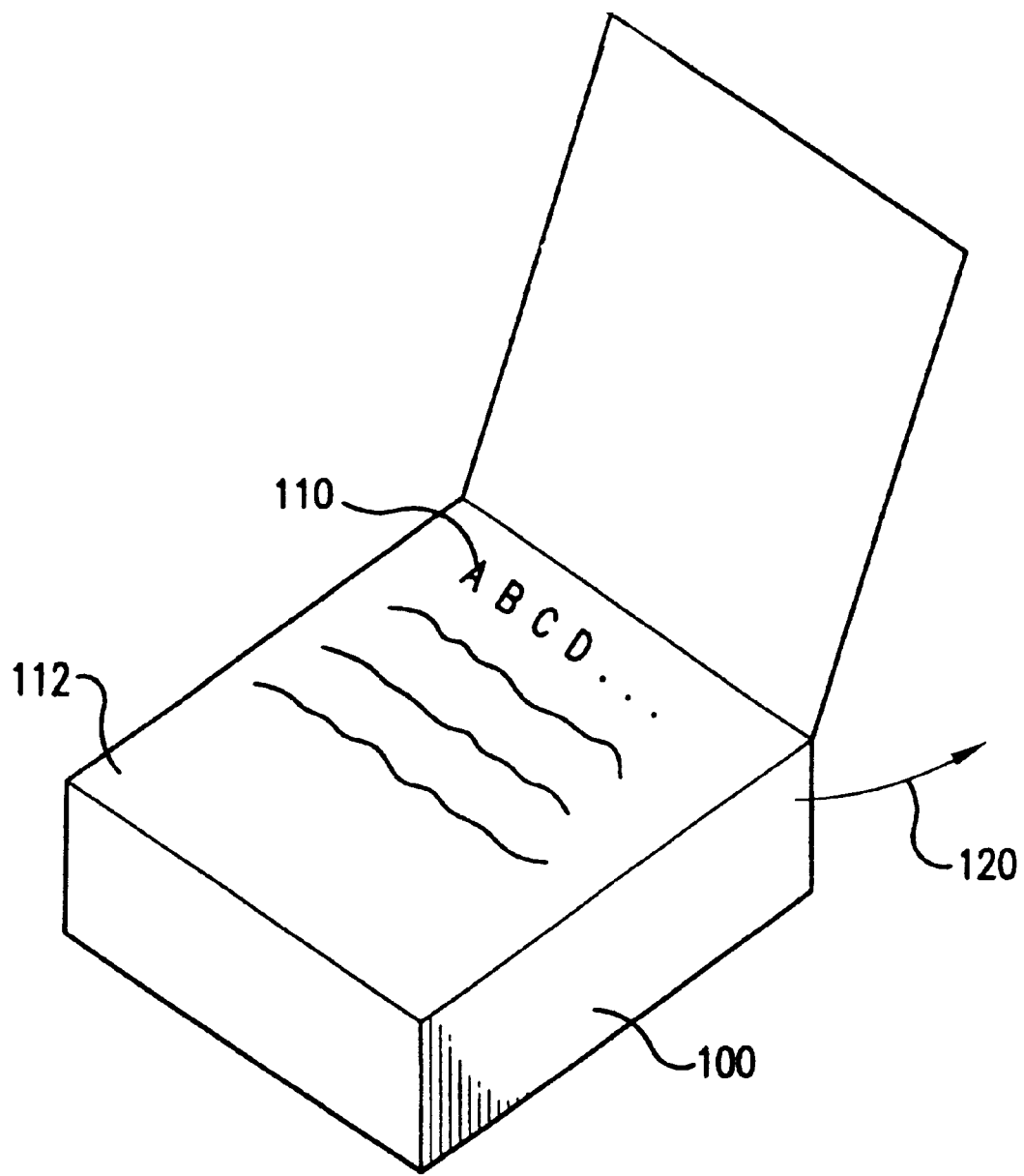
FIG. 1 illustrates a virtual whiteboard scanner according to the present invention.

FIG. 1 illustrates a scanner 100 for use as a virtual white board, whereby an image 110 is written onto the platen 112 or a transparency (not shown) with dry erase markers by an end user. The image is then scanned by the scanner 100, flipped or mirrored left to right by internal circuitry, converted to an electronic signal and transmitted via facsimile, telephone, infrared, cable, modem, Internet, Intranet or other known transmissions means. Other remote conference participants may then access the image via any known electronic signal receiving means, such as the Internet, Intranet, modem, facsimile, telephone, cable, infrared, etc. The remote conference participants may view the image on their computer screen or print it out using a printer or facsimile. The remote conference participants may modify the image and retransmit it. Once the image is scanned into the scanner and flipped, another participant may modify the image or draw changes on another scanner, scan and flip the changes and retransmit the changes that can be integrated with the original image.

Figure 2:
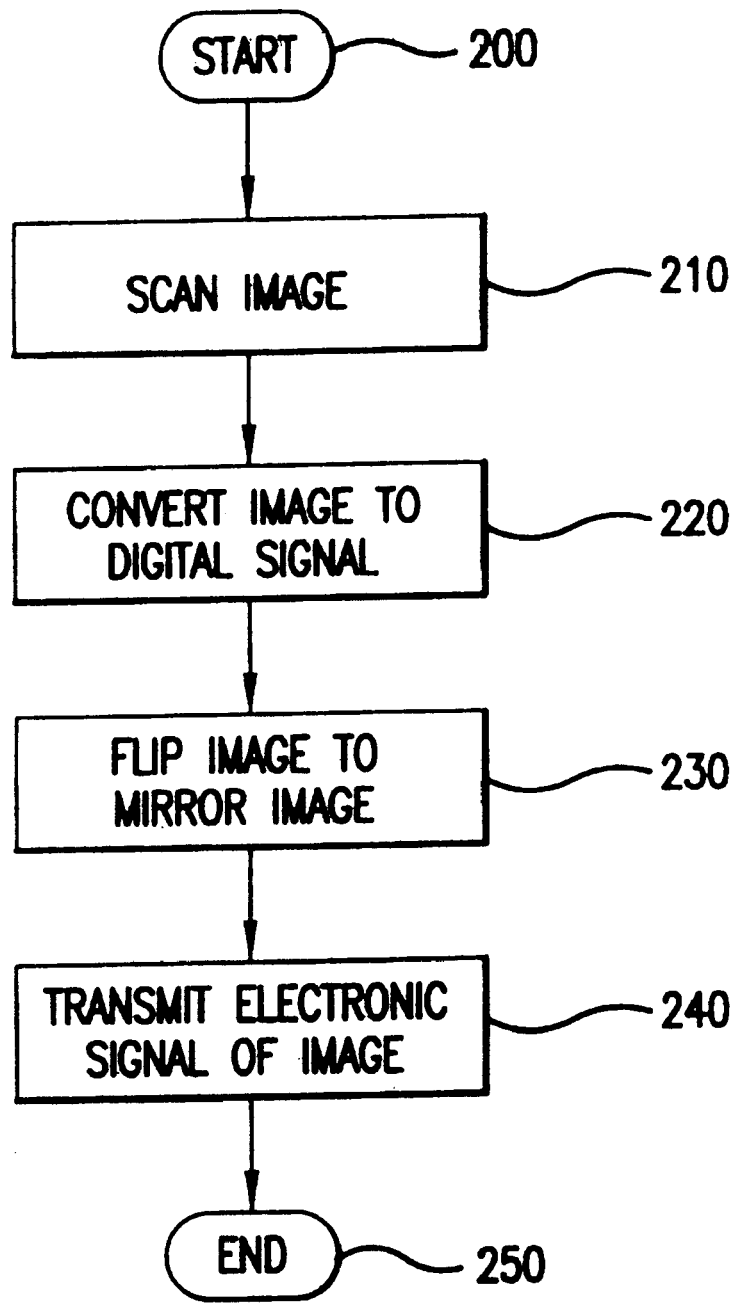
FIG. 2 shows a flow chart illustrating the method for using a scanner as a virtual whiteboard.

FIG. 2 illustrates a flow chart of the method of using the virtual whiteboard according to the present invention. Specifically, once the end user writes on the platen 112 of the scanner 100, the image is scanned 210. The scanning step is a well known step in the scanner technology. The image is then converted to an electronic signal 220 by means of an analog to digital converter and processed digitally or by other known means. Next, the image is flipped or mirrored left to right 230, which may be accomplished by internal software or circuitry within the scanner, usually controlled by the scanning driver, or in the scanning driver, or in the scanning software.

Then the electronic signal is transmitted by any known transmission means, such as telephone, modem, Internet, Intranet, facsimile, cable, infrared, etc. The remote participants may then receive the signal by any known signal reception means and either print the image or display it on their computer screen and manipulate the image accordingly. The image may then be retransmitted.

The foregoing description of the present invention has been presented for purposes of illustration and description. It is not intended to be exhaustive or to limit the invention to the precise form disclosed, and other modifications and variations may be possible in light of the above teachings. For example, the image may be transmitted from or to the Internet to a webpage on the Internet. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A virtual whiteboard comprising:
   means for receiving an image written by user onto the receiving means;
   a scanner adapted to generate a scanned image from the written image;
   means in said scanner for mirroring the scanned image from left to right;
   means in said scanner for converting said mirrored scanned image into an electronic signal; and
   means for transmitting said electronic signal that is representative of said mirrored scanned image.

2. The virtual whiteboard according to claim 1, wherein said means for mirroring said scanned image from left to right is accomplished by the scanner drive.

3. The virtual whiteboard according to claim 1, wherein said means for mirroring said scanned image from left to right is accomplished by scanning software.

4. The virtual whiteboard according to claim 1, wherein said means for converting said mirrored scanned image into an electronic signal representative of said mirrored scanned image further is accomplished by an analog to digital converter.

5. A virtual whiteboard comprising:
   a scanner;
   means in said scanner for mirroring a scanned image from left to right;
   means in said scanner for converting said mirrored scanned image into an electronic signal; and means for transmitting said signal that is representative of said mirrored scanned image, wherein said means for transmitting electronic signal is accomplished by an infrared transmitter.

6. A method for creating a virtual whiteboard comprising the flowing steps:

receiving an image written by a user onto a platen;

scanning the written image;

converting the scanned written image to a digital signal;

processing the digital signal to flip the scanned written image to it's mirror image; and transmitting the signal of the flipped image.

7. A whiteboard, comprising:

a platen adapted to receive an image written onto the platen by a user;

a scanner adapted to generate a scanned image of the written image; and means for generating a mirrored image of the scanned image.

8. A whiteboard, comprising:

a scanner adapted to generate a scanned image;

means for generating a mirrored image of the scanned image; and means for transmitting the mirrored image to a remote location.

9. The whiteboard of claim 7, further comprising means for receiving another scanned image from a remote location.

10. A method for producing a whiteboard, comprising:

providing a platen adapted for receiving an image written onto the platen by a user;

providing a scanner adapted to generate a scanned image from the written image; and providing software adapted to generate a mirrored image of the scanned image.

11. A method for producing a whiteboard, comprising:

providing a scanner adapted to generate a scanned image;

providing software adapted to generate a mirrored image of the scanned image; and providing software adapted to transmit the mirrored image to a remote location.

12. The method of claim 10, further comprising providing software adapted to receive another scanned image from a remote location.

13. A method, comprising:

scanning an image written onto a platen of a scanner;

converting the scanned image to an electronic signal; and transmitting the electronic signal to a remote location.

14. The method of claim 13, further comprising displaying the image at the remote location.

15. The method of claim 13, further comprising printing the image at the remote location.

16. The method of claim 13, further comprising:

receiving the electronic signal at the remote location;

displaying the image at the remote location; and modifying the image at the remote location.

17. The method of claim 16, further comprising retransmitting the modified image from the remote location.

18. The method of claim 13, wherein transmitting comprises transmitting the electronic signal via Internet to the remote location.

19. The method of claim 13, wherein transmitting comprises transmitting the electronic signal via cable to the remote location.

20. The method of claim 13, further comprising scanning an image written onto a transparency.

21. The method of claim 13, wherein scanning comprises scanning an image written onto a platen of a scanner with a dry erase marker.

22. The virtual whiteboard according to claim 1, wherein said means for transmitting the electronic signal is accomplished by an infrared transmitter.

23. The whiteboard of claim 7, further comprising means for transmitting the mirrored image to a remote location.

24. The method of claim 10, further comprising providing software adapted to transmit the mirrored image to a remote location.

\* \* \* \* \*